United States Patent [19]
Polizzotto

[11] Patent Number: 5,456,162
[45] Date of Patent: Oct. 10, 1995

[54] PIE CRUST BAKING SHIELD

[76] Inventor: Joseph Polizzotto, 2757 Mall Dr., Sarasota, Fla. 34231

[21] Appl. No.: 350,280

[22] Filed: Dec. 5, 1994

[51] Int. Cl.⁶ .............................. A47J 36/00; A47J 37/01; A47J 43/00; A21B 3/13
[52] U.S. Cl. ........................ 99/433; 99/DIG. 15; 99/645; 220/4.03; D7/387
[58] Field of Search ............................. 99/343, 349, 430, 99/431, 432, 433, 447, 645, DIG. 15; 126/39 M, 39 R, 376, 9 B; 220/4.03; 249/169, 172, 135; 426/132, 523; D7/387, 586, 402, 356

[56] References Cited

U.S. PATENT DOCUMENTS

| | | | |
|---|---|---|---|
| 2,784,664 | 3/1957 | Tippel | 99/433 |
| 3,580,484 | 5/1971 | Schneider | 99/DIG. 15 |
| 3,951,053 | 4/1976 | Kirkpatrick | 99/433 |

Primary Examiner—Timothy F. Simone
Attorney, Agent, or Firm—Charles J. Prescott

[57] ABSTRACT

A pie crust baking shield for protecting the outer edge portion of pie crust while a pie is being baked. The device may be provided either pre-formed into a ring with unconnected ends or straight for packaging purposes. Both embodiments are flexibly deformable to fit around a range of pie crust diameters and include an upright continuous flange portion and a plurality of side by side generally horizontal flange segments extending orthogonally from the upright flange portion. The free ends of the shield are releasibly connectable in overlapping fashion against one another to define a plurality of preselected pie diameters. In use, the horizontal flange segments are supported atop the pie crust edge to define a continuous shield thereover which prevents burning the edge of the pie during baking.

4 Claims, 2 Drawing Sheets

PIE CRUST BAKING SHIELD

BACKGROUND OF THE INVENTION

1. Scope of Invention

This invention relates generally to pie baking, and more particularly to a reusable shield for protecting the outer edge of a pie crust during baking.

2. Prior Art

The problem of overbaking and burning or charring the outer edge of a pie crust is well known. This occurs because the pie crust edge is very thin compared to the overall thickness of the main potion of the pie.

A number of prior art devices have addressed this problem. One such device is disclosed in U.S. Pat. No. 3,728,957 wherein Polus has invented a baking shield which extends peripherally around the pie pan and has an outer member of flexible foil sheeting which is folded around the outer edge of the pie pan to protect overbaking the pie crust periphery.

Another pie crust guard was invented by Alexander as set forth in U.S. Pat. No. 2,257,408 directed to a transversely split ring member of continuous nature wherein the overlapping split ends supposedly accommodate various pie pan diameters. However, because of the continuous nature of the inwardly extending flange, precise fitting onto any range of pie pan diameters is not accomplished.

Houston, in U.S. Pat. No. 1,834,402 teaches a pie plate attachment consisting of a metal ring adapted to be removably mounted on the rim of the pie plate. The metal ring comprises a continuous strip of metal bent into a circular form and having its ends joined to form a complete ring, thus rendering the device non-adjustable and including additional structural features distinguished from the present invention.

Another pie crust shield is disclosed in U.S. Pat. No. 4,080,884 by Terrell teaching a protective shield comprising at least four separate flexible arcuate segments which slip over the edge of the pie tin to prevent the edge of the crust from overcooking.

Other devices which generally address this same problem are disclosed in the following U.S. Patents:

| | |
|---|---|
| Blynt | 835,212 |
| Scott | 1,375,539 |
| Sabin | 843,109 |
| Anderson | D303,908 |
| McLaughlin | 1,180,782 |

The present invention provides a pie crust baking shield for protecting the outer edge portion of a preselected range of standard pie crust diameters and is easily flexibly deformable to the appropriate preselected pie diameter. Having a segmented inwardly extending pie crust edge flange facilitates contouring the device to exactly conform to each particular pie crust diameter so that the outer edge of the pie crust is fully and continuously protected.

BRIEF SUMMARY OF THE INVENTION

This invention is directed to a pie crust baking shield for protecting the outer edge portion of pie crust while a pie is being baked. The device may be provided either preformed into a ring with unconnected ends or straight for packaging purposes. Both embodiments are flexibly deformable to fit around a range of pie crust diameters and include an upright continuous flange portion and a plurality of side by side generally horizontal flange segments extending orthogonally from the upright flange portion. The free ends of the shield are releasibly connectable in overlapping fashion against one another to define a plurality of preselected pie diameters. In use, the horizontal flange segments are supported atop the pie crust edge to define a continuous shield thereover which prevents burning the edge of the pie during baking.

It is therefore an object of this invention to provide a one-piece pie crust baking shield for protecting the outer edge portion of a pie crust from being burned or charred during baking of a pie.

It is yet another object of this invention to provide a pie crust baking shield which is readily adaptable in uniform circular size to a range of preselected pie tin diameters.

It is yet another object of this invention to provide a pie crust baking shield which may be uniformly shaped to exactly conform to the circular form of a pie crust.

In accordance with these and other objects which will become apparent hereinafter, the instant invention will now be described with reference to the accompanying drawings.

DETAILED DESCRIPTION OF THE INVENTION

Figure 1:
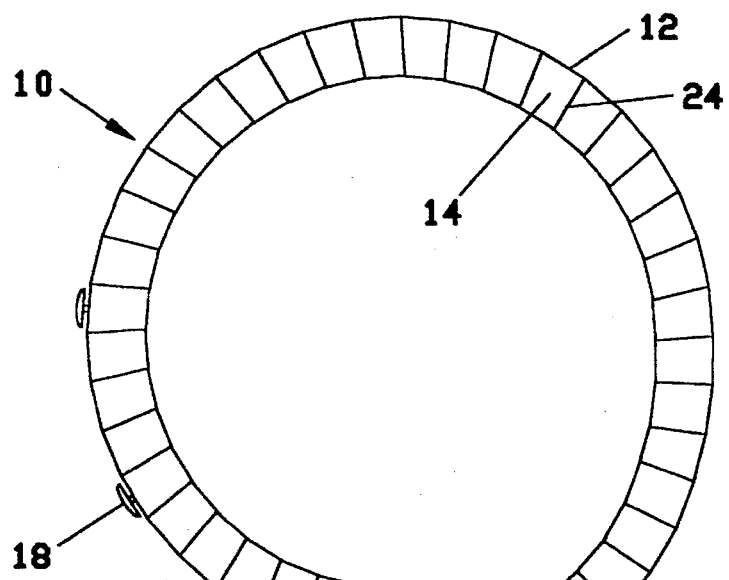
FIG. 1 is a top plan view of the preferred embodiment of the invention depicting the free ends thereof unconnected.

Referring now to the drawings and particularly to FIGS. 1 to 4, the preferred embodiment of the invention is there shown generally at numeral 10 being formed of a one-piece flexible annular shaped ring formed of thin metal such as aluminum in the range of about 0.020" in thickness. The device 10 includes a cylindrical or upright continuous flange 12 and a plurality of uniformly segmented radially inwardly extending flange segments 14 each defined by radial cuts 24 (typ.) which overlap slightly when the device 10 is formed into its circular ready for use configuration. Each horizontal flange segment 14 has a radial width of about 10° or about thirty-six segments 14 extending over the length of the device 10.

Figure 3:
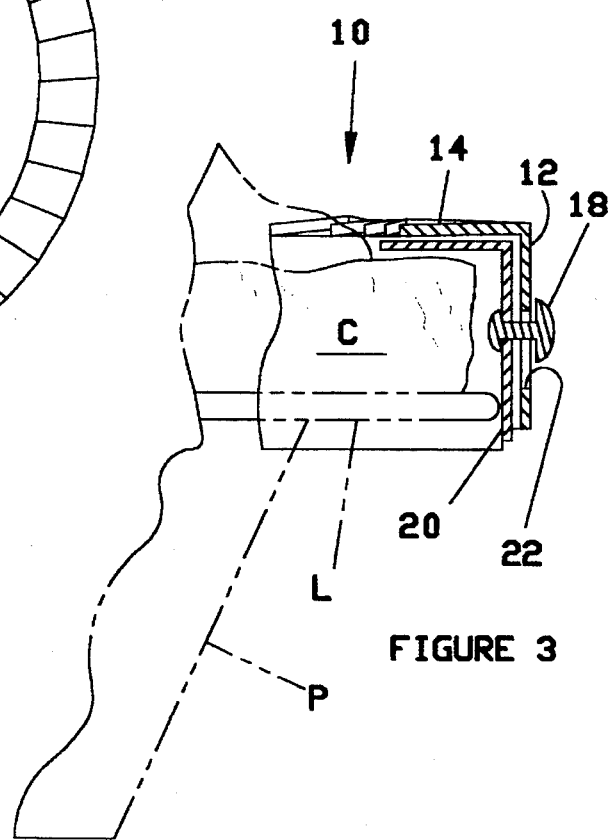
FIG. 3 is a section view in the direction of arrows 3—3 in FIG. 2.
Figure 4:
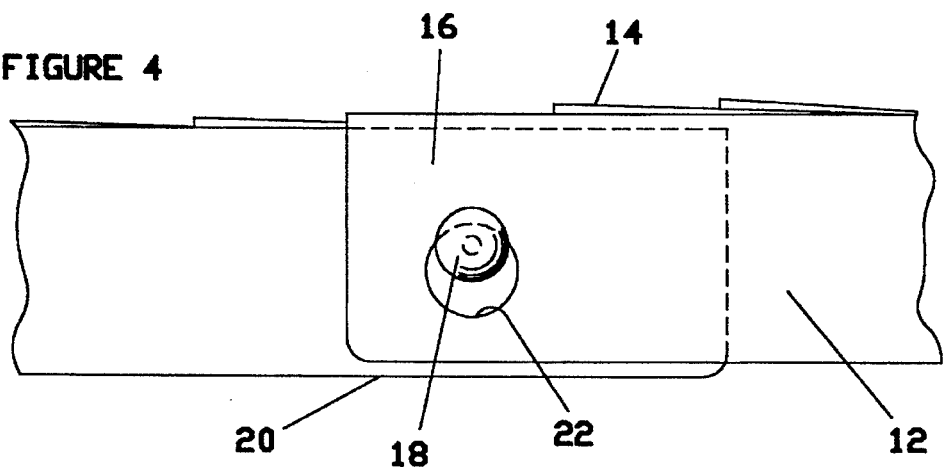
FIG. 4 is a partial side elevation view in the direction of arrows 4—4 in FIG. 2.

One end 16 includes a locking hole 22 formed through the cylindrical wall 12 as best seen in FIG. 3 and 4. Adjacent the other free end are secured a plurality of headed members 18 which are secured as by riveting, resistance welding and the like along portion 20 of the upright flange 12. Each headed members 18 is slightly smaller than locking hole 22 to accommodate insertion therethrough of the enlarged headed member 18 and for releasible locking engagement therebetween as seen in FIGS. 3 and 4. By providing a plurality of these headed members 18 at preselected spaced apart distances and spacing from locking hole 22, adaptation to a plurality of preselected pie plate P diameters is provided.

Figure 2:
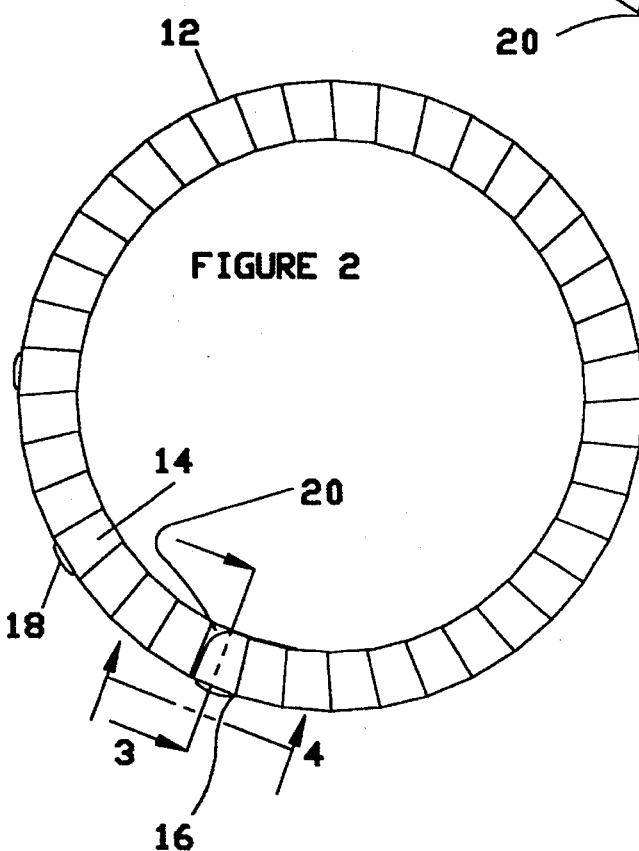
FIG. 2 is a top plan view of FIG. 1 depicting the free ends thereof in an overlapping releasibly connected position.

As will be now understood, as best seen in FIG. 3, the device 10 is first flexible deformed into the diameter of the lip L of pie plate P and then releasibly secured in that position as shown in FIG. 2 by interengagement of headed member 18 through one of the locking holes 22. The upright continuous flange 12 then fits circumferentially around and against the circular perimeter of lip L while the overlapping horizontal flange segments 14 support the device when resting atop the outer edge of the pie crust C. Note that, by the overlapping of each of the horizontal flange segments 14, in effect, a continuous shield is provided over the pie crust C both circumferentially and radially.

Figure 5:
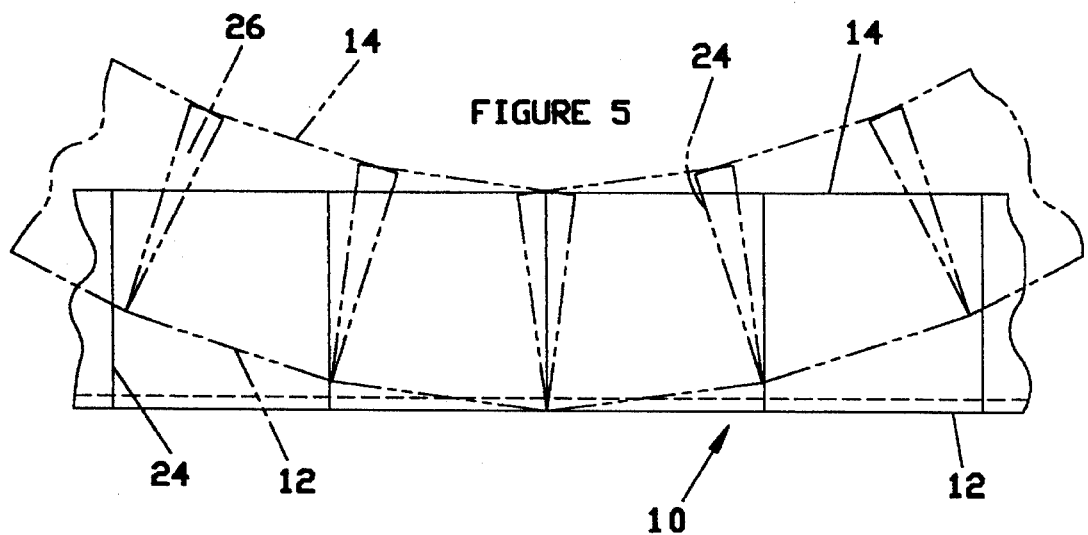
FIG. 5 is an enlarged top plan view of a portion of the embodiment of the invention shown in FIG. 1.
Figure 6:
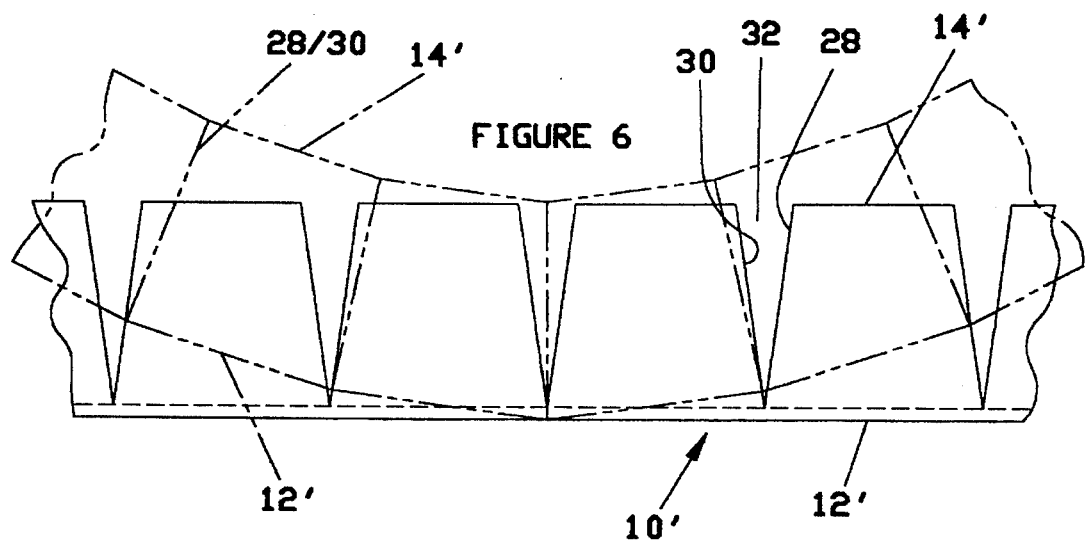
FIG. 6 is a top plan view of an enlarged portion of an alternate embodiment of the invention.

Referring now to FIGS. 5 an 6, the preferred embodiment of the invention is shown generally at 10 as previously described in both a straight configuration in solid lines and a circular configuration in phantom while an alternate embodiment of the invention 10' is shown in FIG. 6. In FIG. 5, the device 10 is shown in solid lines in a straight undeformed configuration as for packaging, shipping and storage convenience. Facilitated by radially cuts 24 which define each of the horizontal flange segments 14, elastic deformation from this straight configuration into the arcuate circular configuration shown in phantom is facilitated with the overlapping flange segments 14 at 26 facilitating this recontouring deformation from a straight to a circular configuration.

In FIGS. 6, notches 32 formed by adjacent cuts 28 and 30 define the alternate configuration of horizontal flange segments 14' and are sized so that, when the device 10' is flexibly deformed from a straight configuration into an arcuate or circular configuration shown in phantom, the edges 28 and 30 meet and provide no overlapping structure. Of course, the exact edge-to-edge meeting point of cuts 28 and 30 occurs at only one particular preselected diameter, the other diameters to accommodate other pie tin sizes either providing a slight gap or an overlap of these edges 28 and 30.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A pie crust baking shield for protecting only an outer edge portion of a pie crust during baking of a pie comprising:

a one-piece flexible annular shaped ring unconnected at overlapping ends thereof;

said ring having a generally L-shaped cross section defined by a generally cylindrical continuous upright portion and a uniformly segmented radially inwardly extending flange portion, a length of each segment of said flange portion generally equal to the width of the pie crust edge;

said ring being flexibly sizable in diameter as facilitated by said segments to be fitted around, and supported atop the outer pie crust edge of, a preselected range of pie diameters, said segments collectively providing a continuous gap-free protective cover for the outer pie crust edge;

means for releasably connecting together, in overlapping fashion, each end of said ring to establish said ring at one of a plurality of said preselected pie diameters.

2. A pie crust baking shield as set forth in claim 1, wherein:

said releasible connecting means includes a plurality of spaced apart enlarged headed members each connected to and outwardly extending from said cylindrical upright portion adjacent one end of said ring and a locking hole formed through said cylindrical upright portion adjacent another end of said ring;

said locking hole slightly larger in diameter than each said headed member for releasible locking engagement of said locking hole over one said headed member;

a distance along said upright portion between said each headed member and said locking hole generally equal to a circumference of one preselected pie diameter.

3. A pie crust edge shield comprising:

a one-piece flexible, deformable elongated member having an L-shaped cross section defined by a continuous upright flange and a segmented horizontal flange extending orthogonally from an upper margin of said upright flange;

said member elastically and deformably shapeable facilitated by said segments into a circle with overlapping ends thereof, with said upright flange becoming generally cylindrical and equal in diameter to that of one of a plurality of preselected pie crust diameters;

means for releasably connecting against one another, in overlapping fashion, each end portion of said member after being shaped into one said preselected diameter, said shield being supported by positioning said segments atop and protectively covering the circular edge of the pie crust;

said segments defining a continuous gap-free protective covering for the circular edge of the pie crust.

4. A pie crust baking shield as set forth in claim 3, wherein:

said releasible connecting means includes a plurality of spaced apart enlarged headed members each connected to and outwardly extending from said upright flange adjacent one end of said ring and a locking hole formed through said upright flange adjacent another end of said ring;

said locking hole slightly larger in diameter than each said headed member for releasible locking engagement of said locking hole over one said headed member;

a distance along said upright portion between said each headed member and said locking hole generally equal to a circumference of one preselected pie diameter.

* * * * *